Patented May 2, 1933

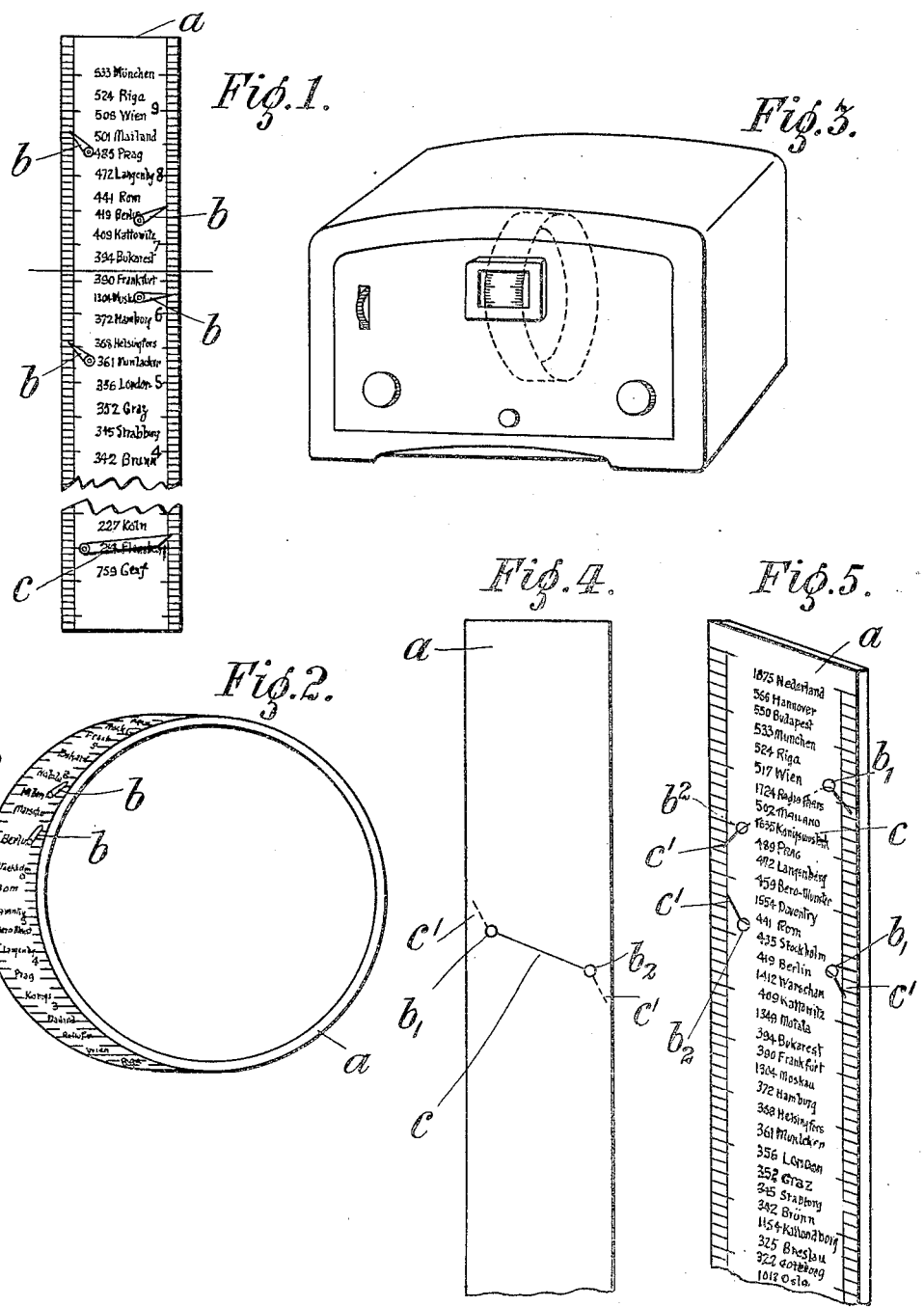

1,907,232

UNITED STATES PATENT OFFICE

MANFRED ARON, OF BERLIN-WESTEND, AND HANS KANTE, OF BERLIN, GERMANY, ASSIGNORS TO ARONWERKE ELEKTRIZITÄTS AKTIENGESELLSCHAFT, OF BERLIN-CHARLOTTENBURG, GERMANY, A CORPORATION OF GERMANY

STATION INDICATOR FOR RADIORECEIVERS

Application filed April 21, 1932, Serial No. 606,646, and in Germany September 28, 1931.

This invention relates to station indicators used in conjunction with the tuning means of radio receivers.

In such station indicators, the names of the stations are imprined on a scale which is connected with the tuning means, and the station names are related or connected by fixed reference lines to the scale graduations corresponding to the relevant wave lengths. The gauging of these scales, however, is a matter of much difficulty, because the tuning circuits of individual receivers, as a result of differences arising in course of manufacture, exhibit certain deviations which make it necessary to gauge each scale individually.

In order to overcome this difficulty, adjustable riders have been arranged on the station scale, which riders are imprinted with or carry the different station names. The disadvantage of such station riders is that they become easily lost, and, in consequence of the imprinting thereon, they occupy relatively much space, so that only a very limited number can be put on the scale at one time.

The object of the present invention is to provide station scales with means whereby the gauging of scales of individual receivers can be carried out more quickly and easily than hitherto, and in such a manner that the scale can be gauged or standardized in respect of any number or the whole of the stations of which the names are imprinted or carried thereon.

According to the invention, a station indicator for a radio receiver is provided with gauge pointer means so adjustable in relation to graduations marked or fixed along with station names on a station scale, that the correct relation between any or all of the station names and the graduations can be standardized or gauged for the receiver by the said pointer means.

More specifically, a station indicator is provided with a scale having small gauge pointers adjustably secured or riveted thereon in adjacency to one or more of a number of station names, the pointer of each station being so made that it can be turned or directed as desired on to the graduated part of the scale which is found in practice to correspond with proper tuning of the receiver to the said station.

If desired, pointers corresponding to different stations or wave lengths may be made in different colours or otherwise distinguished from each other. The pointer or pointers may also be made of transparent material such as celluloid, and this material may be slightly coloured.

In accordance with a further feature of the invention, the pointers may be constituted by flexible elements, the bending of which serves to indicate the standardized connection or relationship between the station names and graduations for tuning purposes. Thus, the station scale may be provided with holes through which thin flexible wire or wires is or are inserted. One end of these wires may be disposed on the front of the scale to constitute a pointer, whilst the other end is fixed to the rear of the scale. Alternatively, each piece of wire may be drawn through two holes of the scale, in such a manner that the wire runs over the back of the scale and its two ends each form a flexible gauge pointer at the front. If desired, the holes for the gauge pointers of successive station names may be arranged alternately right and left.

Embodiments of the invention will now be described, by way of example, with reference to the annexed drawing, in which:—

Fig. 1 is a view of a station scale adapted to be wrapped on a drum connected with the tuning means;

Fig. 2 is a perspective view of the scale (Fig. 1) in position on the drum;

Fig. 3 is a diagrammatic view of the scale and drum in the radio receiver;

Figs. 4 and 5 are respectively rear and front views of another form of station scale according to the invention.

Referring to Figs. 1 and 2:—

The scale $a$ has the usual graduations at its edges, and the different station names are arranged up the middle. Each station name is imprinted at the position of the graduation which corresponds to the wave length of the relative station. In order to take into account unavoidable inaccuracies of the imprints, a small pointer $b$ is turnably fixed (e. g. riveted) beside the station names or beside certain of these names on the scale. The said pointer is directed towards the graduations of the scale and can be easily adjusted by the user of the apparatus to obtain correct tuning-in or reception with respect to the relative station. Thereupon it forms a permanent record of the standard graduation for the relative station. If the pointer is made of such a length as to extend over the width of the scale, as, for example, the pointer $c$, it can suitably be made of transparent material which, for the purpose of easy and clear distinction, can be coloured. The pointers corresponding to different wave lengths may be made in different colours in order that they may be readily distinguishable from one another. If the scale is connected with the movable tuning means, the reading of the scale is taken at a fixed index mark, which in Fig. 1, is indicated by a transverse line extending across the breadth of the scale. Instead of this, a reverse arrangement is possible, in which the scale printed with the station names is fixed, and the index mark is connected with the tuning means and is movable before the scale.

The former arrangement is shown diagrammatically in Fig. 3, in which the station scale is connected with a rotatable tuning means, and is movable over a window provided in the casing of the radio receiver, this window having fixed to it a stationary index member.

Referring to Figs. 4 and 5:—

As is set forth in these figures, the scale $a$ is provided alongside the station names with small holes $b^1$, $b^2$. Through these holes are inserted pieces of very thin and flexible wire $c$ (e. g. copper wire of 0.4 mm. diameter), in such a manner that the ends $c^1$ of the wire project outwards at the front of the scale and serve as gauge pointers, which can easily be bent into the desired position. The projecting ends $c^1$ of the wire lie close to the upper surface of the scale, and, as is clear from Fig. 4, the wire is of such a length that it sticks through both holes $b^1$, $b^2$ and runs across the rear side of the scale. In this case, it is sufficient to arrange the holes beside the station names alternately right and left, so that the piece of wire with successive stations is drawn through the right hole of the one station and the left hole of the other station. The holes $b$ as well as the thickness of the scale $a$ are greatly magnified in the figures. In practice, the scale consists of thin celluloid or pasteboard, whilst the holes are only so big as to enable the wire to be drawn through.

Obviously, also, other arrangements of the pieces of wire on the scale are possible. For example, one end of the wire can be pasted or otherwise fastened on the rear side of the scale. Moreover, it is possible to select wires with different colours corresponding to the different wave lengths.

We claim:—

1. A station indicator for a radio receiver having, in combination, station scale means provided with station names and graduations arranged in accordance with wave lengths, pointer means for said scale means, index means adapted to co-operate with said graduations, and means for adjustably securing said pointers on said scale means so that for any station said pointer means can be directed on to the part of said graduations which in register with said index means gives correct tuning-in to said station by said receiver.

2. In or for a radio receiver, the combination of a station scale having thereon station names and graduations arranged according to wave lengths, gauge pointers for said scale, and means whereby each said pointer is turnably fixed on said scale beside a station name thereon to enable a record to be obtained of the part of said graduations corresponding in respect of said station name with correct tuning-in of said receiver.

3. A station scale for radio receivers, having station names and graduations provided thereon in combination with gauge pointers, and means whereby said pointers are riveted to said scale so as to be turnable to indicate correspondence between any station name and graduation of said scale for tuning purposes.

4. In or for a radio receiver, the combination of a station scale having thereon station names and graduations arranged according to wave lengths, a plurality of gauge pointers provided on said scale for said different station names and made different from each other so as to be readily distinguishable, and means whereby each said pointer is turnably fixed on said scale beside a station name thereon to enable a record to be obtained of the part of said graduations corresponding in respect of said station name with correct tuning of said receiver.

5. A station scale for radio receivers, having station names and graduations provided thereon in combination with gauge pointers distinctively coloured from one another, and means whereby each said pointer is secured to said scale so as to be turnable to indicate correspondence between a station name and part of said graduations for tuning purposes.

6. A station indicator for a radio receiver having, in combination, station scale means provided with station names and graduations arranged in accordance with wave lengths, gauge pointer means made of transparent material, index means adapted to co-operate with said graduations, and means for adjustably securing said pointers on said scale means so that for any station said pointer means can be directed to the part of said graduations which in register with said index means gives correct tuning-in to said station by said receiver.

7. A station indicator according to claim 6 comprising gauge pointer means made of transparent material slightly coloured.

8. A station indicator according to claim 6 comprising gauge pointer means made of celluloid.

9. A station indicator for a radio receiver comprising a station scale having thereon station names and graduations arranged according to wave lengths, flexible pointer elements for said scale, and means whereby said pointer elements are secured to said scale so that part thereof can be bent to indicate correspondence between any station name and graduated part of said scale for tuning purposes.

10. A station indicator for a radio receiver comprising a station scale having thereon station names and graduations arranged according to wave lengths, pointer elements made from thin flexible wire inserted through holes in said scale, and means whereby said pointer elements are secured to said scale so that they can be bent to indicate correspondence between any station name and graduated part of said scale for tuning purposes.

11. In or for radio receivers, a station scale having thereon station names and graduations arranged according to wave lengths, wire pointers drawn through holes in said scale adjacent station names and graduations, and means for securing said wire pointers on said scale so as to be adjustable to compensate for deviations between said station names and graduations indicated as of corresponding wave length to said names.

12. A station scale for radio receivers having station names and graduations provided thereon in combination with gauge pointers, and means whereby said pointers are secured on said scale alternately right and left of successive station names thereon, so as to be turnable to indicate correspondence between any station name and adjoining graduations for tuning purposes.

13. A station indicator for a radio receiver comprising a station scale having thereon station names and graduations arranged according to wave lengths, pointer elements made from thin flexible wire inserted through holes in said scale provided alternately right and left of successive station names thereof, so that ends of said wire can be bent to indicate correspondence between any station name and graduated part of said scale for tuning purposes.

14. In or for radio receivers, a station scale having thereon station names and graduations arranged according to wave length, wire pointers drawn through holes in said scale adjacent station names and graduations and differently coloured from one another, and means for securing said wire pointers on said scale so as to be adjustable to compensate for deviations between said station names and adjoining graduations indicated as of corresponding wave length to said names.

In testimony whereof we affix our signatures.

MANFRED ARON.
HANS KANTE.